United States Patent
Kocher et al.

[15] 3,688,216
[45] Aug. 29, 1972

[54] CELL FOR USE IN A CIRCULATING LIQUID LASER

[72] Inventors: Robert Kocher, Great Neck; Franklin Moore, Ithaca; Harold Samelson, Sea Cliff, all of N.Y.

[73] Assignee: General Telephone & Electronics Laboratories Incorporated

[22] Filed: Oct. 16, 1970

[21] Appl. No.: 81,388

[52] U.S. Cl. ............... 331/94.5, 356/246, 250/218
[51] Int. Cl. ........................... H01s 3/02, H01s 3/20
[58] Field of Search ....... 331/94.5; 356/246; 250/218

[56] References Cited

UNITED STATES PATENTS 3,520,517    7/1970    Hrdina.......................356/246
3,583,817    6/1971    Rachlis..................356/246 X

OTHER PUBLICATIONS

Watson et al., IEEE J. of Quantum Electronics, Vol. QE–4, No. 11, Nov. 1968, pp. 842– 849.

Primary Examiner—Ronald L. Wibert
Assistant Examiner—R. J. Webster
Attorney—Irving Kriegsman

[57]    ABSTRACT

A flowing liquid laser cell has end faces cut at the Brewster angle. Liquid enters the input chamber of the cell parallel to the end face. A rotary motion is imparted to the liquid and a stabilized liquid flow is promptly and smoothly established in the active region of the cell. The cell has an output chamber which allows for deceleration of the liquid leaving the active region.

9 Claims, 9 Drawing Figures

INVENTORS.
ROBERT KOCHER
FRANKLIN MOORE
HAROLD SAMELSON

BY

*R.J Frank*
ATTORNEY.

INVENTORS.
ROBERT KOCHER
FRANKLIN MOORE
BY HAROLD SAMELSON

R. J Frank
ATTORNEY

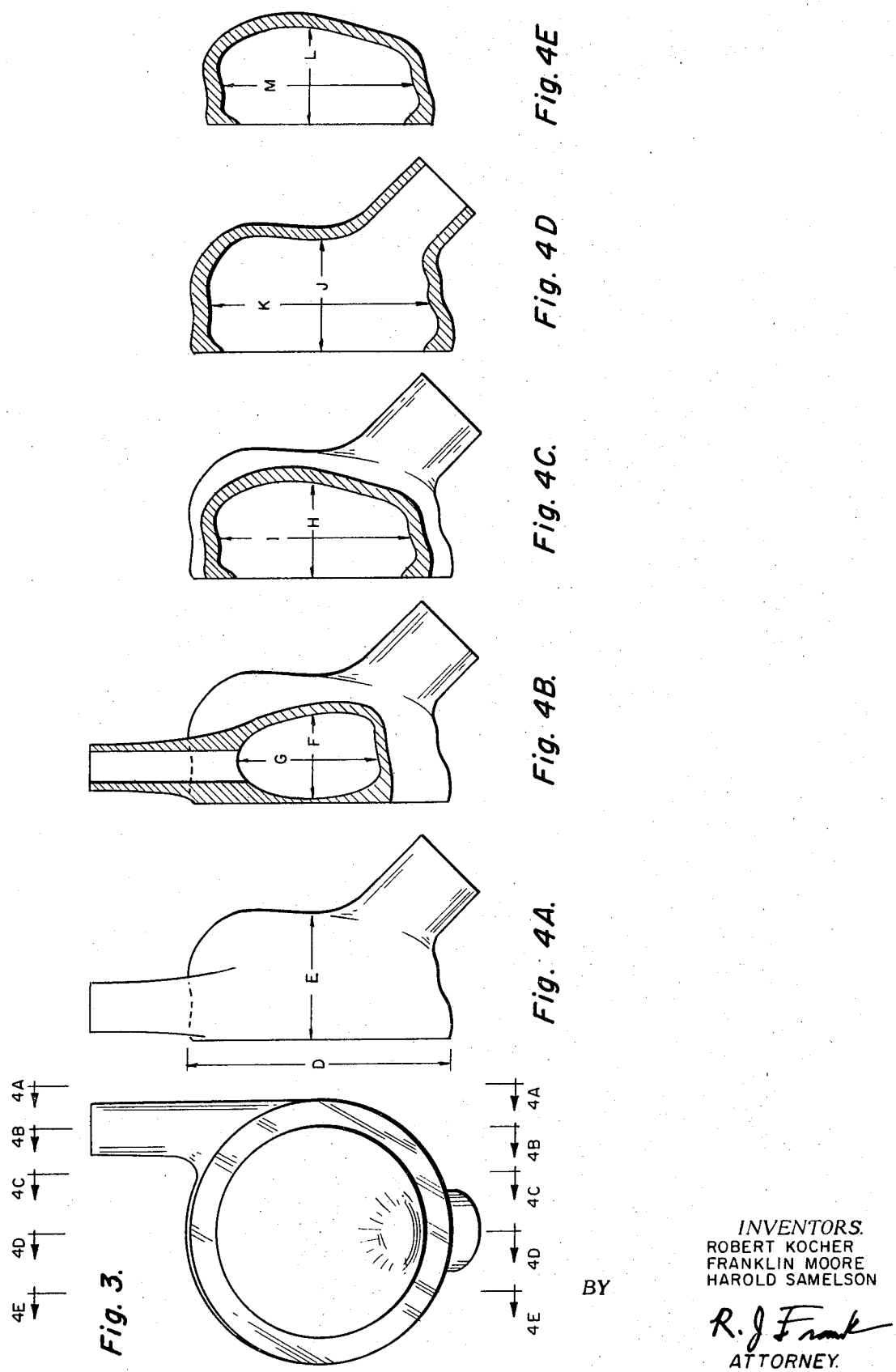

3,688,216

CELL FOR USE IN A CIRCULATING LIQUID LASER

BACKGROUND OF THE INVENTION

The invention relates to lasers and in particular to cells for lasers which utilize a flowing liquid as the active material.

Solids, gases and liquids have been used as active material in lasers. Lasing is initiated by raising the energy levels of the atoms in the active material from the level which they normally occupy to a higher energy level or excited state. This process of excitation is generally accomplished in a liquid laser by a high intensity light source. As hereinafter used, the term "active material" shall refer only to a liquid active material.

When the atoms of the active material are in an excited state, they can be stimulated to emit a photon by interacting with an incident photon. As a result, the incoming photon, or wave, is augmented by the one given up by the excited atom. The released wave falls in phase with the wave that triggered its release. Hence an amplifying action ensues.

In order to sustain laser operation, the laser cell must be part of a resonant cavity having at least two separated reflecting surfaces, one of which is partially transmissive. The wave caused by the release of the photon from the atom in the excited state must travel a path which is substantially parallel to the longitudinal axis of the resonant cavity so that it can be repeatedly reflected through the active material. As the wave travels through the material it stimulates more atoms to release photons which further amplifies and reinforces the wave. Each time the wave is reflected at the partially transmissive reflecting surface a small portion of it passes through this surface. This small portion constitutes the laser output beam. To prevent spurious reflections at the laser windows, which are located at opposite ends of the cell, from interfering with the laser output beam, the end faces of the cell may be cut at the Brewster angle with respect to the photon stream. (The Brewster angle of a dielectric such as the laser window, is defined as that angle of incidence for which an electromagnetic wave, polarized in the plane of incidence, will be transmitted through the dielectric without any reflections.)

Two desirable properties of the laser output beam are coherence and collimation. Optical distortion of the laser output beam shall herein be taken to mean an impairment of either of these properties. The optical characteristic of the liquid active material which primarily determines the quality of the output laser beam is the uniformity of the refractive index of the liquid which in turn is dependent upon the uniformity of liquid temperature and density. With the end face of the cell cut at the Brewster angle, a stagnant layer of liquid tends to accumulate adjacent to the window of the cell. When the laser is excited, large amounts of heat may be absorbed unevenly by the liquid in the active region and adjacent the end face of the cell tending to cause the liquid to have warmer and cooler layers which results in a non-uniform refractive index for the liquid. Excitation of the laser while these non-uniform conditions exist will cause optical distortion of the laser output beam.

In the flowing liquid laser, substitution of the liquid flowing into the cell for the liquid which had previously been excited tends to maintain isothermal conditions in the liquid and the cell with the result that the flowing liquid laser can be excited more frequently.

By increasing the flow rate of the liquid through the cell until the flow becomes turbulent, mixing of the warmer and cooler liquid layers within the cell is increased with the consequence of further reducing temperature inhomogeneities and index of refraction gradients therein. However, even under turbulent flow conditions, relatively high distortion was found to exist in the laser output beam after repeated excitations. Accordingly, we have invented a liquid laser cell which has the advantages of using a flowing liquid as the active material while substantially reducing the adverse optical effects found in previous lasers employing liquid active material.

SUMMARY OF THE INVENTION

The present invention relates to a cell for an axial flow laser which utilizes a flowing liquid as the active material and in particular to a cell having end faces oriented at an oblique angle to the longitudinal axis of the active region of the cell.

When liquid active material flows into a cell in a direction perpendicular to its longitudinal axis, a stagnant layer of liquid tends to accumulate at the end face adjacent to the entrance to the cell. After repeated excitation of the active material this stagnant liquid becomes warmer than the surrounding liquid. Mixing of the cooler and warmer liquids near the entrance to the cell causes random variations in the refractive index of the liquid resulting in optical distortion of the laser output beam. The optical distortion is further increased when the end faces of the cell are oriented at an oblique angle to the longitudinal axis of the cell.

Changing the liquid input direction so that the liquid enters the cell adjacent to and in a plane parallel to the end face will reduce the stagnant liquid layer. However, due to the subsequent change in the direction of liquid flow, eddying and other large scale disturbances and unstable flow conditions tend to be produced in the cell. In addition, at the output of the cell, the liquid must undergo a similar change in direction of flow which causes eddying and other large scale disturbances of the flow adjacent to the output end of the cell. These large scale disturbances and the unstabilized flow conditions increase the optical distortion in the laser output beam. The cell of this invention is designed to reduce the optical distortion caused by the disturbance of the liquid in the cell and to provide a stabilized flow of liquid through the cell parallel to the longitudinal axis.

The cell comprises an active region having a longitudinal axis and having an input chamber coupled to one end thereof. The input chamber consists of an end face having the inner surface thereof oriented at an oblique angle (preferably the Brewster angle) to the longitudinal axis, first control means positioned adjacent the end face and a second control means interposed between the first control means and the active region. Liquid active material entering the cell is incident on the first flow control means which imparts a rotational motion to the liquid having an axis of rotation substantially perpendicular to the end face. The liquid then flows into the second flow control means which displaces the axis of rotation of the liquid to coincide with the longitudinal axis of the cell thereby producing smoothly and promptly a rotationally stabilized flow of liquid at the entrance to and within the active region.

The first and second flow control means comprise sections of first and second oblate spheroids. The first oblate spheroid section has its polar axis in a direction normal to the end face and the second section has its polar axis in a direction intermediate the axis of the first section and the longitudinal cell axes. The spheroid sections partially overlap, the intersection thereof being shaped so as to facilitate passage of the flow from the first to the second control means. The intersection of the second control means and the entrance to the active region are also shaped to provide smooth entry of the flow into the active region of the cell.

The flow of the liquid entering the cell causes a vigorous motion in the liquid adjacent the end face of the cell which prevents the accumulation of a stagnant layer. Smooth change in the direction of rotation which the liquid undergoes in the input chamber prevents formation of large scale eddying and other disturbances in the liquid flow.

The cell further comprises an output chamber coupled to the other end of the active region, the liquid active material flowing out of the cell through the output chamber. The output chamber acts as a plenum; i.e. a smooth diffusion or deceleration of the liquid flow as the liquid leaves the cell preventing flow separation and the formation of fluctuating eddies at the exit of the active region.

Further features and advantages of the invention will become more readily apparent from the following detailed description of a specific embodiment of the invention when taken in conjunction with the accompanying drawings.

BRIEF DESCRIPTION OF THE DRAWINGS

FIG. 3 is an end view of the input chamber.

FIGS. 4A–4E are a series of cross-sectional views of the input chamber taken in the planes indicated in FIG. 3.

DESCRIPTION OF THE PREFERRED EMBODIMENT

Figure 1:
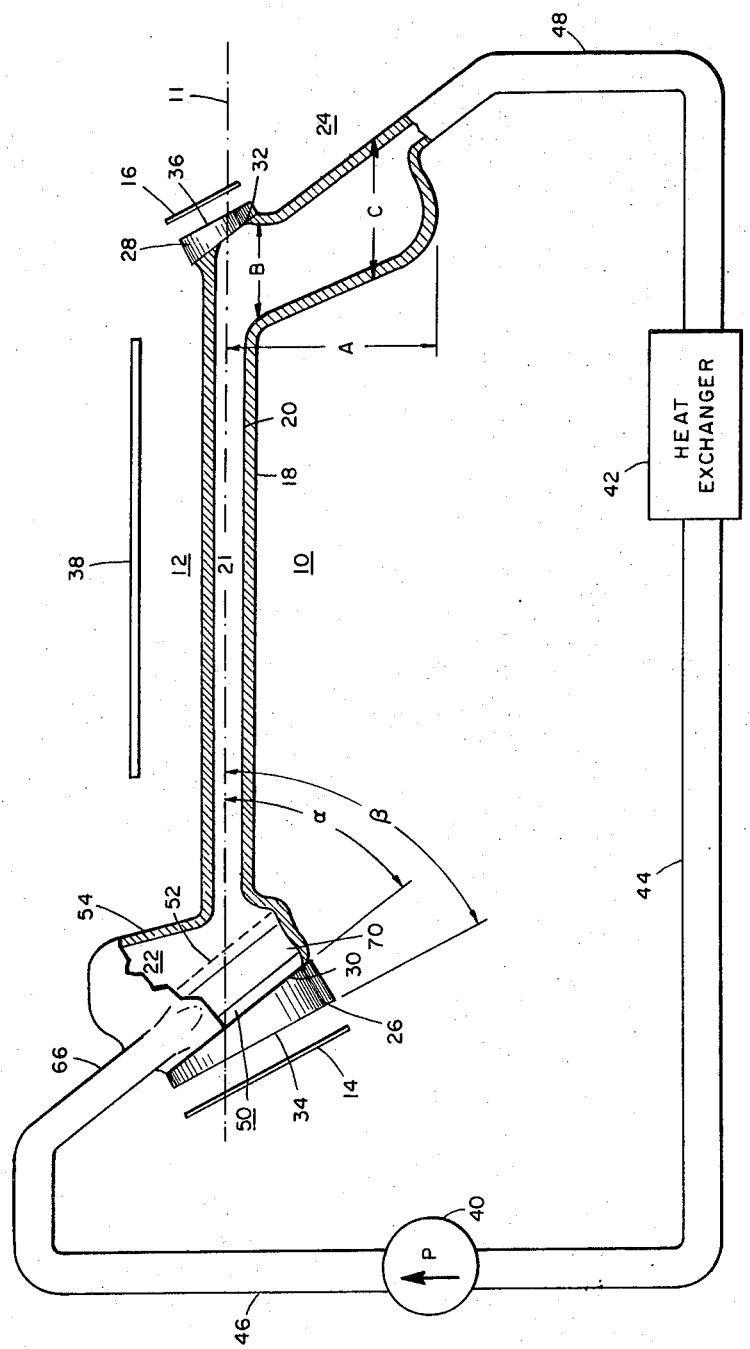
FIG. 1 is a cross-sectional drawing of a flowing liquid laser utilizing the cell of this invention.

Referring now to FIG. 1, there is shown a schematic representation of a circulating liquid laser. A circulating laser is one in which the liquid active material continuously flows through a closed system. The liquid active material is an inorganic solution of a compound containing an active ion, an inorganic solvent and a Lewis acid. Although many such solutions may be employed, in the preferred form of the invention the active ion is trivalent neodymium, the inorganic solvent is phosphorus oxychloride and the Lewis acid is zirconium tetrachloride.

This solution is represented by the formula $POCl_3 : ZrCl_4 : Nd^{+3}$ and may be prepared by the following procedure: 5 grams of neodymium oxide powder, $Nd_2O_3$, are added to a solvent consisting of 84 cubic centimeters of anhydrous phosphorus oxychloride and 16 cubic centimeters of zirconium tetrachloride. Approximately 1 cubic centimeter of distilled water is then slowly stirred into the mixture whereupon the $Nd_2O_3$ dissolves in the solution. When the $Nd_2O_3$ is fully dissolved, essentially all hydrogen-containing species are removed by boiling off approximately two-thirds of the total volume in a standard distillation apparatus equipped with a dessicating agent to maintain an anhydrous atmosphere. The resultant gel can then be diluted to a total volume of 100 cubic centimeters with anhydrous phosphorus oxychloride to provide a 0.3 M solution. Additional details concerning the preparation of a liquid active material utilizing phosphorus oxychloride as an inorganic solvent may be found in pending U.S. Pat. application Ser. No. 781,471 filed Dec. 5, 1968 and assigned to the same assignee as this application now U.S. Pat. No. 3,558,504.

The circulating liquid laser consists of a resonant cavity 10 having a longitudinal axis 11 and containing a cell 12 and mirrors 14 and 16 mounted externally to cell 12. One of the mirrors, for example mirror 14, is totally reflective, i.e. it reflects substantially all of the light impinging upon it. The other mirror, mirror 16, is only partially reflective in that it reflects only a portion of the light impinging upon it while permitting the remainder of the light to be transmitted therethrough as the output beam of the laser.

Cell 12 has an outer surface 18 and an inner surface 20 and can be constructed of either Pyrex glass or quartz. The ratio of the outside diameter of the active region to the inside diameter of the active region is preferably made approximately equal to the index of refraction of cell material. For example, if the cell is made from pyrex this ratio is approximately 1.43. Under these conditions, the energy from the light source will be focused on the liquid active material in the active region of the cell thereby increasing the amount of energy absorbed by the active material.

The cell comprises an active region 21, an input chamber 22 and an output chamber 24, chambers 22 and 24 being positioned at opposite ends of active region 21. Positioned at the input and output ends respectively are end faces or windows 26 and 28 which may be constructed of the same material as the remainder of the cell. The inner surfaces 30 and 32 of end faces 26 and 28, respectively, are oriented at the Brewster angle with respect to the longitudinal axis. This angle is determined by the relative refractive indices of the liquid active material and the window material. For a window made from Pyrex glass and an active material of $POCl_3 : ZrCl_4 : Nd^{+3}$ this angle, $\alpha$, equals approximately 48°. The outer surfaces 34 and 36 of windows 26 and 28 respectively are oriented at the Brewster angle determined by the refractive indices of the window material and air. With a Pyrex glass window this angle, $\beta$, is approximately 62°.

Excitation means in the form of light source 38, positioned in close proximity to cell 12 provides a source of excitation energy to the active material flowing through the cell. The light source may take the form of a high pressure Xenon filled lamp which is controlled by an external circuit (not shown). The walls of cell 12 are constructed of quartz or other material which transmits radiation with negligible attenuation at the frequency required to excite the active material.

The laser further comprises a pump 40 for circulating the liquid active material through the laser and heat exchanger 42 which cools the liquid after it flows out of cell 12. Lines 44, 46 and 48 interconnect pump 40, heat exchanger 42 and cell 12.

In operation, pump 40 circulates the liquid active material in cell 12 and line 46 at a sufficiently high volume flow rate to produce turbulence in the liquid. Under turbulent flow conditions, the liquid velocity distribution between the walls of a pipe or tube such as cell 12 or line 46 depends upon the strength and extent of the turbulent mixing process. Turbulence causes mixing of the liquid particles in adjacent layers of the liquid thereby producing a homogeneous liquid which tends to move with uniform velocity at a particular cross section of the tube. Due to boundary layer conditions, a layer of liquid near the cell wall will flow under laminar flow conditions giving rise to a large radial velocity gradient proximate to the wall. In addition, under stable turbulent flow conditions the liquid flow is symmetrical with the axis of the active region.

A laser output beam is obtained by actuating light source 38. Part of the energy thus produced is absorbed by the liquid active material causing stimulated emission of photons. In addition, the temperature of the active material is raised causing a decrease in the liquid density which results in a decrease in the index of refraction of the liquid.

To obtain minimum distortion in the laser output beam it is necessary that the photons emitted during excitation travel in a path substantially parallel to longitudinal axis 11 so that they can be repeatedly reflected through the active material by mirrors 14 and 16 at the ends of resonant cavity 10. A radial variation in the index of refraction of the liquid in the cell or unstable flow conditions in the active region of the cell will cause the photons to be refracted resulting in a deviation from this path. With turbulent flow conditions existing in the active region, the mixing of adjacent fluid layers tends to smooth out temperature inhomogeneities which may exist due to differences in the liquid velocities. Thus, turbulent flow in the active region results in a substantially uniform index of refraction in the radial direction. (An index of refraction gradient may exist proximate the cell walls due to the laminar liquid layer.)

By directing the flow of liquid entering the cell at an angle substantially parallel to the end face of the cell, the incoming liquid flows over the window thereby preventing accumulation of a stagnant liquid layer which could cause a variation in the index of refraction of the liquid adjacent the input to the cell. The liquid active material entering the cell must then undergo a change in direction within the input chamber in order that a stabilized flow of liquid be established in the active region. A stabilized flow in the active region of the cell requires that the flow have a nearly uniform cross-sectional velocity and be symmetrical with the longitudinal axis in the active region. Changing the direction of flow may give rise to eddying and other large scale disturbances adjacent the active region and to unstable flow conditions within the active region of the cell causing distortion of the laser output beam. Cell 12 is designed to prevent a stagnant layer of liquid accumulating adjacent the end face of the cell, to prevent establishment of eddying and other large scale disturbances in the liquid and to provide stable liquid flow in the active region. In addition, the depth of the laminar liquid layer adjacent to the cell walls is reduced.

Figure 2:
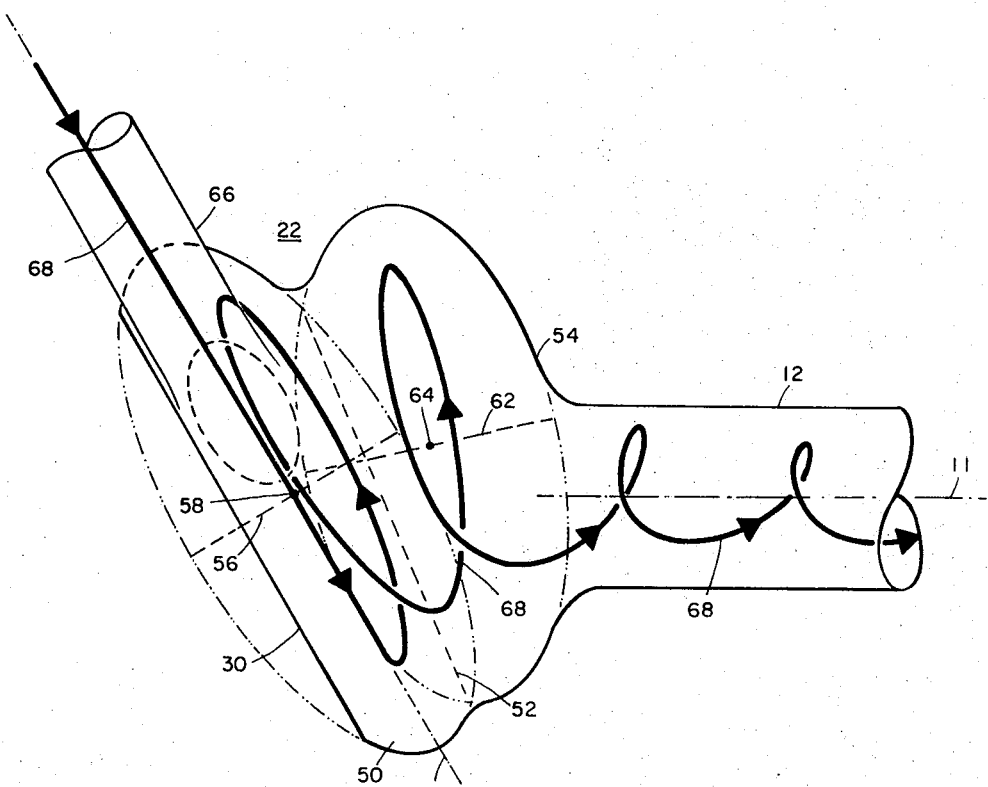
FIG. 2 is a schematic representation of the input chamber of FIG. 1 for the purpose of explaining the liquid flow principle.

FIG. 2 is a simplified drawing of the input chamber of FIG. 1 and illustrates the principle of operation of the cell. (Corresponding elements of FIGS. 1 and 2 have the same reference numerals.) Input chamber 22 comprises first flow control means 50 extending generally between surface 30 and dotted line 52 and second flow control means 54 extending generally between dotted line 52 and the entrance to active region 21. The first and second flow control means comprise first and second partially overlapping sections of oblate spheroids. The polar axis 56 of the first oblate spheroid section is oriented in a direction perpendicular to the inner surface of the end face and intersects longitudinal axis 11 at the center 58 of the first section. Transverse axis 60 of the first oblate spheroid is parallel to inner surface 30. The polar axis 62 of the second oblate spheroid section is oriented in a direction intermediate the polar axis 56 and longitudinal axis 11 with the center 64 of the second section vertically offset from longitudinal axis 11. Input port 66 provides an opening in the input chamber through which active material can flow into the cell.

In operation, the input port directs the flow of liquid active material into the input chamber tangent to the inner surface of the first oblate spheroid section and parallel to the inner surface 30 of end face 26. A typical stream-line 68 is shown in FIG. 2 as it flows through the cell. The liquid flows around the inner surface of the first section which causes a rotational motion to be imparted to the liquid; the axis of rotation being perpendicular to inner surface 30. A channel 70 (FIG. 1) is the equivalent of the first section of FIG. 2, that is it imparts a rotational motion to the fluid and maintains the liquid proximate to inner surface 30 preventing accumulation of a stagnant layer of liquid. After rotational motion is imparted to the liquid in the first section, the liquid flows into the second oblate spheroid section. The intersection of the first and second sections is shaped so as to facilitate passage of the liquid from the first to the second section. The second section displaces the axis of rotation of the liquid from its initial direction perpendicular to inner surface 30 until it coincides with the longitudinal axis of the cell prior to the liquid flowing into the active region. The intersection of the second flow control means and the entrance to the active region is shaped to provide smooth entry of the flow into the active region.

With the liquid flow rate and the volume of the second section properly adjusted, a rotationally stabilized flow of liquid is created at the entrance to and within the active region of the cell. The rotational motion is symmetrical with longitudinal axis 11 and the liquid flow helically through the active region with the axis of the helix coincident with the longitudinal axis of the cell. Thus, the direction of flow of the incoming liquid active material is rotated smoothly and uniformly, and stable flow is established in the active region of the cell thereby preventing eddying or other large scale disturbances from forming. In addition, no stagnant layer of liquid accumulates adjacent to the end face of the cell.

The liquid active material flows through active region 21 and into output chamber 24. The output chamber acts as a plenum allowing a smooth diffusion or deceleration of the liquid as it flows out of the active region thereby preventing flow separation and the formation of fluctuating eddies in the liquid adjacent to the exit from the active region.

Figure 5:
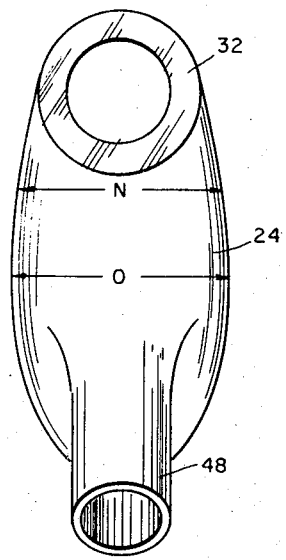
FIG. 5 is an end view of the output chamber of the invention with the window removed.

In a typical cell of this invention the inside diameter of the active region is about 0.67 inch, the outside diameter is about 1 inch and the axial length of the active region is about 11 inches. The outside diameter of the end face of the input chamber is about 3 inches. Referring to the drawings, the dimensions of the typical cell corresponding to the letter designations shown thereon are as follows:

|   | Designation | Dimension (inches) |
|---|---|---|
| FIG. 1 | A | 2 3/4 |
|  | B | 1 1/4 |
|  | C | 1 3/4 |
| FIGS. 4A–4E | D | 3 |
|  | E | 1 5/8 |
|  | F | 1 |
|  | G | 1 1/2 |
|  | H | 1 3/16 |
|  | I | 2 1/2 |
|  | J | 1 5/16 |
|  | K | 2 5/8 |
|  | L | 1 |
|  | M | 2 |
| FIG. 5 | N | 1 |
|  | O | 1 1/2 |

What is claimed is:

1. A cell for a laser which utilizes a flowing liquid as the active material comprising
   a. an active region having a longitudinal axis,
   b. an input chamber coupled to one end thereof, said input chamber comprising
      1. an end window having an inner surface oriented at an oblique angle to the longitudinal axis of said active region;
      2. a first control means positioned adjacent the inner surface of said end window and having an aperture therein for entry of said liquid, said first control means imparting a rotational motion to said liquid and
      3. a second control means interposed between said first control means and said active region, said second control means displacing the axis of rotation of the liquid in said first control means to coincide with the longitudinal axis of said active region thereby producing smoothly and promptly a rotationally stabilized flow of said liquid within said active region, and
   c. outlet means coupled to the other end thereof, said output means including an end window oriented at an angle to the longitudinal axis of said active region.

2. The cell of claim 1 wherein said first and second control means comprise sections of first and second oblate spheroids.

3. The cell of claim 2 wherein said first oblate spheroid has a polar axis oriented in a direction perpendicular to the inner surface of said end window and intersecting the longitudinal axis of said oblate spheroid, and wherein said second oblate spheroid has a polar axis oriented in a direction intermediate the polar axis of said first section and the longitudinal axis of said active region with the center of said second section offset from the center of said first section.

4. The cell of claim 3 further comprising an input port coupled to the aperture in said first flow control means, said input port directing the entering flow of the liquid active material adjacent the inner surface of said end window and tangent to the inner surface of said first flow control means.

5. The cell of claim 4 and wherein said output means comprises an output chamber coupled to the other end of said active region, said output chamber acting as a plenum allowing a smooth deceleration of the liquid as it leaves said active region.

6. The cell of claim 5 wherein said first oblate spheroid is formed by a channel in the inner surface of said first flow control means.

7. The cell of claim 6 wherein the inner surface of the end window of each chamber is cut at the Brewster angle.

8. Apparatus for causing stimulated emission of radiation from a liquid active material comprising
   a. a cell for holding the liquid active material, said cell comprising
      1. an active region having a longitudinal axis,
      2. an input chamber coupled to one end of said active region, said input chamber comprising
         A. an end window having an inner surface thereof oriented at an oblique angle to the longitudinal axis of said active region,
         B. a first oblate spheroid section positioned adjacent to the inner surface of said end window and having an aperture therein for entry of said liquid, said first section having a polar axis oriented in a direction perpendicular to the inner surface of said end window and intersecting the longitudinal axis of said active region at the center of said first section, said first section imparting a rotational motion to said liquid and
         C. a second oblate spheroid section partially overlapping said first oblate spheroid section and interposed between said first section and said active region, said second section having a polar axis oriented in a direction intermediate the polar axis of said first section and the longitudinal axis of said active region with the center of said second section offset from the center of said first section, said second section displacing the axis of rotation of the liquid to coincide with the longitudinal axis of said active region thereby producing a rotationally stabilized flow of liquid within said active region,
      3. an output chamber coupled to the other end of said active region, said output chamber having an end window oriented at an angle to the longitudinal axis of the active region and acting as a plenum allowing a smooth deceleration of the liquid as it leaves said active region, b. a source of excitation energy positioned proximate to said active region, said source of excitation energy being actuated to cause said liquid active material in said active region to emit a stream of photons, c. first and second reflecting means positioned proximate to the ends of said input and output chambers respectively, said reflecting means causing said stream of photons to be repeatedly reflected through said active region, and d. pump means coupled to said input chamber for causing said liquid active material to flow through said cell.

9. The cell of claim 8 further comprising heat exchange means coupled between the output of said cell and said pump means, said heat exchange means cooling said liquid active material after said material flows out of said cell, said pump means causing said liquid active material to circulate in a closed system.

* * * * *